Aug. 25, 1959
G. K. TEAL
2,901,381
METHOD OF MAKING ELECTRICAL RESISTORS
Filed Oct. 12, 1956
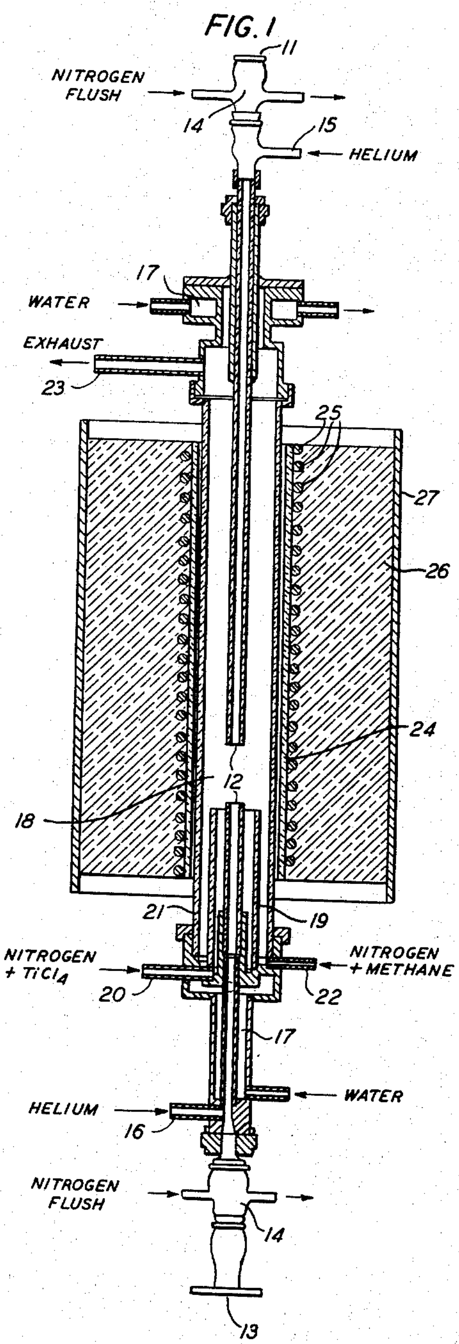
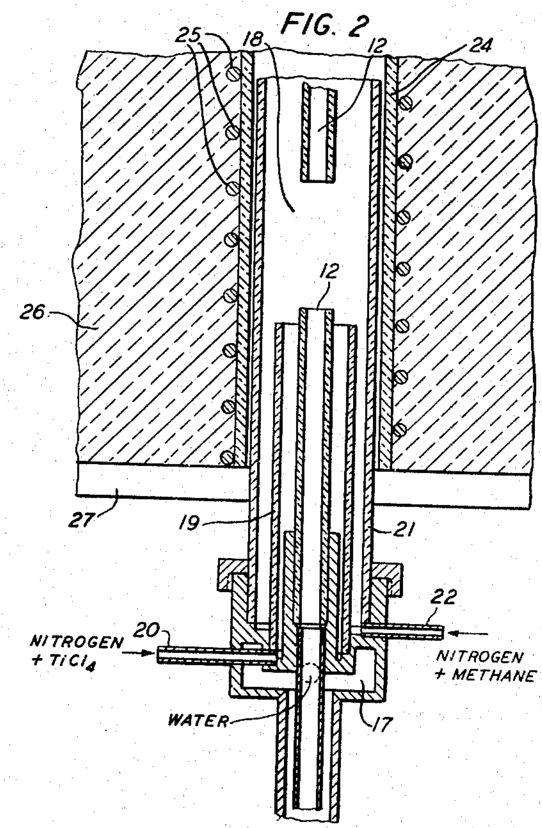
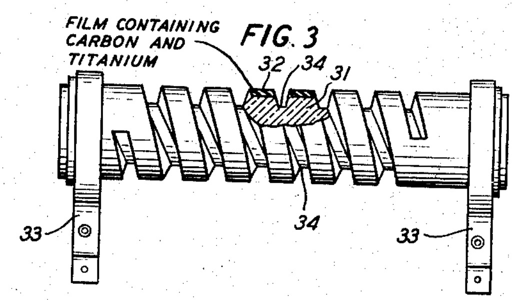
INVENTOR
G. K. TEAL
BY Edwin B. Cave
ATTORNEY United States Patent Office 2,901,381
Patented Aug. 25, 1959

2,901,381

METHOD OF MAKING ELECTRICAL RESISTORS

Gordon K. Teal, Dallas, Tex., assignor to Bell Telephone Laboratories, Incorporated, New York, N.Y., a corporation of New York Application October 12, 1956, Serial No. 615,644

7 Claims. (Cl. 117—221)

This invention relates to methods of making films having high electrical surface resistance, and relates particularly to methods of depositing films having high electrical surface resistance which contain carbon and titanium in some form.

In the manufacture of film resistors, which are commonly comprised of a non-conducting core of a ceramic composition and a film thereon of conducting material having substantial electrical resistance, it is usually desired to keep the resistive films thin. A thin film, tightly adherent to an underlying core, is usually less susceptible to mechanical damage from scratches or abrasion than is a thicker film of the same material deposited on a similar core. On the other hand, a certain minimum thickness is required in order to conserve the character and continuity of the film. These opposing considerations lead to a preferred thickness range for deposited films.

The resistance of a film is a property inversely dependent on the thickness of the film of resistive material present. In theory, films of successively higher resistance could be produced from a given material by making the films successively thinner. In practice, however, the maximum resistance obtainable in a film of a given material is limited by the desire to keep film thickness within the aforementioned preferred range. To increase film resistance while maintaining a minimum film thickness, then, a material of higher specific resistivity must be chosen.

The resistivities of common prior art materials, such as carbon, are often too low to permit deposition of films of very high resistance which have also thicknesses within the preferred thickness range. For carbon, for example, the production of films with a surface resistance greater than about $10^4$ ohms per square is difficult.

The present invention teaches the production of films having a high electrical surface resistance by deposition of the films from gaseous mixtures of carbon compounds and titanium compounds which are pyrolyzed on a heated non-conducting core. Films can be produced by this method which have a surface resistance as high as 0.375 megohm per square; yet, the thickness of such films can be kept in the preferred range of $10^{-4}$ to $10^{-6}$ centimeters.

In the new method, vapors of volatile titanium compounds are admixed with a carbonaceous gas and passed over a non-conducting base heated to a temperature sufficient to decompose the gaseous compounds. Upon decomposition, titanium and carbon, in some form, are left in a thin film on the nonconducting core, which can then be subsequently fashioned into a resistor.

In the accompanying drawings:

Fig. 1 is a front view, partly in section, of a suitable type of apparatus in which deposition may be accomplished; and Fig. 2 is a front view, in section, of a portion of Fig. 1 enlarged to show the detailed construction of the apparatus of Fig. 1 in the region of the reaction zone; and Fig. 3 is a front view, partly in section, of a resistor made according to the present invention.

The apparatus shown in Fig. 1 is of a design which has given especially satisfactory film deposits. Substantially continuous lengths of the non-conducting core on which a film containing titanium and carbon is to be deposited are fed downward through upper aperture 11, descend through the apparatus through guide tubes 12, and emerge covered with a film at lower aperture 13. Mechanical means (not shown) are provided for moving the continuous core piece through guide tubes 12 by pushing and pulling, with, generally, a rate of travel of the core through the apparatus between 6 inches per minute and 1½ inches per minute being maintained. Guide tubes 12 are mounted such that one end of each tube opposes, on a common vertical axis which is the longitudinal tube axis, an end of the other of the two tubes, separation 18 of approximately two inches, measured along the common axis, being maintained between the open opposing ends of the tubes. Cross streams of an inert gas, conveniently nitrogen, are passed through seal-fittings 14 at the extreme ends of the guide tubes. This gas flush and flexible rubber diaphragms, seated at apertures 11 and 13 and punctured to permit the passage of the core piece through the apparatus, act to keep air from entering guide tubes 12.

Other streams of inert gas, conveniently helium, are fed into upper and lower guide tubes 12 at points 15 and 16, respectively, in the diagram. These oppositely directed gas streams keep the coating gases from entering guide tubes 12, and escape at break 18 in the guide tubes, merging there with the film-coating gases. It is at axial break 18 that the core piece is exposed to the coating atmosphere and in this region deposition of the film takes place.

Water is led through cooling chambers 17 in the upper and lower portions of the apparatus. Chambers 17 serve to confine heat to the portion of the apparatus between them; the lower chamber, in addition, functions to cool the inert gas entering inlet 16, which gas in turn then lowers the temperature of the filmed cores before they emerge at aperture 13.

Immediately beneath reaction zone 18, and beginning at the upper end of lower guide tube 12, second tube 19 concentrically surrounds the lower of the two guide tubes. This second tube, conveniently 1¼ inches in diameter, is connected to gas line 20 through which a carrier gas, preferably nitrogen, saturated with vapors of a titanium compound, preferably titanium tetrachloride, is eventually led to the reaction zone 18.

Concentric with both guide tubes 12 and second duct 19 for reactants, there is larger cylindrical jacket 21, conveniently having an outside diameter of two inches. Jacket 21 shields reaction zone 18, and is sealed above and below the reaction zone around the tubes passing through it, but has inlet 22 for the admission of a carbonaceous gas, preferably methane, which may be mixed with an inert gaseous diluent or carrier gas. Outlet 23 removes all excess and unreacted active components, inert carrier and diluent, and the gaseous decomposition products formed in zone 18.

Immediately surrounding jacket 21 is refractory furnace core 24 on which is wound electrical resistance wire 25. Furnace core 24 has, conveniently, an inside diameter of two inches, so that it fits snugly over jacket 21. The surface of furnace core 24 may be corrugated to hold wire windings 25 in position. Current passed through windings 25, which are preferably of a platinum-rhodium alloy, furnishes the heat required to bring the apparatus to a desired temperature.

Entire core 24 and windings 25 are embedded in thermal insulating material 26, conveniently a granular refractory material, the whole being then protected by metal casing 27.

In Fig. 2 is given a detailed view of that portion of the apparatus of Fig. 1 surrounding deposition chamber 18. In Fig. 2 are shown guide tubes 12, concentric tube 19 for reactants and inlet tube 20, cylindrical jacket 21 and corresponding inlet 22, furnace core 24, resistance winding 25, insulating sheath 26 and metal casing 27, and a portion of lower cooling chamber 17.

Guide tubes 12, reactant tube 19, and cylindrical jacket 21 are preferably made of a heat-resistant ceramic such as McDanel high-temperature combustion-tube porcelain. Furnace core 24 is, similarly, composed of heat resistant ceramic, and an Alundum material, such as Norton No. 8707 RA98, has proved convenient.

The resistor of Fig. 3 is made up of nonconducting base 31, generally a ceramic composition, at the surface of which is deposited film 32 containing carbon and titanium. Metal terminals 33 are fastened to the end of the resistor to make electrical contact with the carbon layer. A thin metal film covering the portion of the carbon layer at which the metal terminals are applied may facilitate making electrical contact. In the resistor shown, helical groove 34 has been cut through the film surface into the ceramic base to increase the length of the current path through the electrically resistive layer.

As a source of titanium in the deposition process, titanium tetrachloride has proved most satisfactory. With a melting point of minus 30° C. and a boiling point of about 136° C., the tetrachloride is a very convenient compound for obtaining titanium-containing vapors without the use of high temperatures for volatilization.

The carbonaceous gases amenable to use in the deposition are usually gaseous or readily-volatizable paraffinic and aromatic hydrocarbons, such as methane, ethane, propane, butane, benzene, toluene, and xylene, or partially halogenated hydrocarbons. Methane particularly has proved convenient and effective as a source of carbon on pyrolysis. A mixture of two or more carbonaceous gases may also be used.

For best results in producing thin films having a high surface resistance, the ratio of titanium atoms to carbon atoms in the depositing gas mixture is preferably kept between the values ¼ and ½. Particularly good results have been obtained when this ratio has a value of ⅓. If compounds containing one atom each of titanium or carbon, respectively, are used as the active ingredients of the depositing mixtures, then the ratios given above express also the relative volumes of the gases, at the same temperature and pressure, to be mixed together. For example, if titanium tetrachloride and methane are used as the depositing gases, the percentage, by volume of the tetrachloride in the mixture of active gases will vary preferably between 20 percent and 33⅓ percent, with the best films being deposited when the volume ratio $TiCl_4/TiCl_4+CH_4$ has a value of 25 percent. The balance of the active mixture will be the carbonaceous component. If such carbonaceous gases are chosen as containing more than one carbon atom per molecule, the relative volumes of the gas and of titanium tetrachloride to be mixed to give the atomic ratio Ti/C a value between ¼ and ½ can be easily calculated.

Although it is possible to stream mixtures of pure gaseous $TiCl_4$ and some pure carbon compound directly to the heated surface at which deposition is to take place, considerations of flow rates and the rate of film deposition preferably call for a dilution of the gaseous pure compounds with an inert gas. A water-free substance chemically inert in character best serves the purpose. Argon, helium, or nitrogen, for example, are satisfactory diluents. Some diluent gas is most easily introduced with the stream of titanium tetrachloride as a carrier for the vapors of titanium tetrachloride. The balance of the gas desired to be added may be added with the carbonaceous component either as a diluent or as a carrier for the carbonaceous component, but mixture of the diluent with either of the reacting gases alone suffices, and the dilution may occur at any point in the system including the area immediately surrounding the heated base on which deposition is to occur.

In a preferred example, nitrogen has been used both as a diluent and as a carrier gas functioning to transport the vapors of volatile titanium compounds to the reaction zone where they are decomposed and deposition occurs. Nitrogen does not interfere chemically in the proper thermal decomposition of the compounds which it carries or with which it is mixed. Other gases preferably having a similar property, such as argon or helium can also be used.

As the presence of water vapor and oxidizing impurities such as oxygen may be detrimental to the formation of a suitable deposit, the diluent and carrier gases are preferably dried and oxygen removed therefrom. Admixture of small amounts of hydrogen and passage over a palladinized alumina catalyst has, for example, been used to convert oxygen as an impurity in the gases to water vapor. Water vapor itself may be removed by contact of the gas with a drying agent, and passage of the gas over calcium hydride, for example, has been successfully used as a drying step. Because nitrogen is readily available dry and with a high degree of purity, it is most often used as a gaseous vehicle in the deposition process.

As mentioned, both the titanium tetrachloride and carbonaceous gas may be introduced into the system by mixture with an inert carrier gas. For liquid $TiCl_4$, the carrier gas, nitrogen for example, is conveniently passed slowly through the liquid so as to saturate the carrier. From vapor pressure-temperature data on $TiCl_4$, the content of $TiCl_4$ in the mixture can then be determined. For example, at 20° C., the vapor pressure of $TiCl_4$ is 9.5 millimeters. Carrier gas at atmospheric pressure passed through and saturated with $TiCl_4$ at this temperature will have a fractional $TiCl_4$ content, by volume, of $$\frac{9.5}{760-9.5}V$$

where V is the total volume of mixed carrier and $TiCl_4$.

Knowing the quantity of $TiCl_4$ being introduced into the system, the flow of carbonaceous gas can be adjusted to give the proper ratio, as discussed above, of titanium atoms to carbon atoms. If the carbonaceous component is itselt gaseous, like methane, a carrier may not be needed. For liquid carbon compounds, such as benzene, a carrier may prove a convenient means of introducing vapors of the compound into the system. Finally, the active and carrier gases may then be mixed with an inert diluent gas to bring the final volume of the depositing gas mixture to a value correspondent with the final flow rate desired.

The flow of gases about the heated base should be such that a turbulence sufficient to get a homogeneous uniform coating of deposit on all portions of the base results. The flow rate is largely determined by the geometry of the deposition apparatus. Once a rate suitable for giving a uniform deposit is reached, it is generally more convenient to vary the composition of the gas mixture or the time for which contact between the heated base and the mixture is maintained, as the variables controlling the thickness and chemical make-up of the deposit, rather than to alter the rate of flow of the depositing gas mixture.

In an apparatus of the construction shown in the drawings, a total rate of flow of gases between 600 cubic centimeters per minute and 1200 cubic centimeters per minute has proved efficacious for the particular existing geometry. A total rate of flow of 800 cubic centimeters per minute has been found as most desirable, and the depositions are generally done with this amount of gas passing. As mentioned, a deposition apparatus, of which the one shown in the drawings is an example, may have an almost unique geometry which may affect the optimum flow-rate value in that apparatus.

The temperatures at which the most satisfactory depositions occur lie within the approximate limits 1000° C. to 1350° C. and preferably between 1100° C. and 1200° C. Lower temperatures do not generally give good deposits, and at higher temperatures some materials from which the resistor bases are manufactured may become unstable. Further, the design of apparatus to withstand such higher temperatures becomes difficult. Deposition temperatures of 1125° C. to 1200° C. are found best. A particularly effective operating temperature is about 1170° C.

The resistor bases on which the deposit is laid are generally of a ceramic composition, though any non-conducting material stable at an elevated deposition temperature would suffice. A number of suitable ceramic materials is suggested in the patent to R. O. Grisdale, A. C. Pfister and G. K. Teal, United States 2,671,735, granted March 9, 1954. The ceramics may be either vitreous or porcelain-like in nature. A particularly suitable ceramic composition is described in United States Patent 2,386,633, issued October 9, 1945, to M. D. Rigterink. Bodies shaped of this material are fired at approximately 1250° C. after being shaped from a paste of 15 parts flint ground to 325 mesh, 50 parts of kaolin, sufficient water to give a proper consistency, and 35 parts of a fired mixture of 60 parts kaolin, 10 parts magnesium carbonate, 10 parts calcium carbonate, 10 parts strontium carbonate, and 10 parts barium carbonate, said mixture being previously calcined at 1200° C. and ground thereafter to 325 mesh.

Film thickness is usually kept between $10^{-4}$ centimeters and $10^{-6}$ centimeters. By increasing or decreasing the period of time for which a portion of the heated non-conducting base remains exposed to depositing gases in the reaction zone, the film thickness may be correspondingly increased or decreased at will.

It is not known in what form titanium and carbon are present in the films deposited by the methods here taught. It is believed that complex mixtures of materials, including carbon, titanium carbide, and titanium nitride may be produced by the pyrolytic decompositions described.

A preferred method of depositing films containing carbon and titanium is given below as a non-limiting example.

*Example 1*

A ceramic core was passed through the deposition apparatus shown in Fig. 1 of the accompanying drawings at a rate of 6 inches per minute. The ceramic core had a temperature of about 1170° C. when in that portion of the apparatus in which deposition took place on the core. A mixture of gases, consisting of nitrogen, titanium tetrachloride, and methane was passed over the heated core in the reaction zone at the rate of 800 cubic centimeters per minute. The depositing mixture contained 0.17 percent of titanium tetrachloride vapors by volume and 0.5 percent of methane by volume, the balance being nitrogen used as a carrier and diluent. The ratio of titanium atoms to carbon atoms in such a mixture was about 1/3, so that titanium tetrachloride comprised about 25 percent by volume of the active ingredients in the depositing mixture, the remaining 75 percent of active ingredients being methane. A film approximately $10^{-6}$ centimeters in thickness was obtained, which film had a surface resistance of 375,000 ohms per square. The temperature coefficient of resistance of the film was minus 2414 parts per million per degree centigrade.

Though specific embodiments of the invention have been shown and described herein, they are meant to be illustrative only and not as limiting the scope and spirit of the invention.

What is claimed is:

1. The method of forming an electrical resistor having a high resistance deposited layer which comprises pyrolytically decomposing a gaseous mixture comprising titanium tetrachloride and a carbonaceous gas at the heated surface of a base on which said film is to be deposited.

2. The method of forming an electrical resistor having a high resistance deposited layer which comprises pyrolytically decomposing a gaseous mixture comprising titanium tetrachloride and a carbonaceous gas, in which gaseous mixture the ratio of the number of titanium atoms to the number of carbon atoms is between 1/4 and 1/2, at the heated surface of a base on which said film is to be deposited.

3. The method as described in claim 2 for which said carbonaceous gas is methane.

4. The method of forming an electrical resistor having a high resistance deposited layer which comprises pyrolytically decomposing a gaseous mixture of titanium tetrachloride and a carbonaceous gas, in which gaseous mixture the ratio of the number of titanium atoms to the number of carbon atoms is between 1/4 and 1/2, at a temperature between 1000° C. and 1350° C., at the surface of a base, heated to said temperature, on which said film is to be deposited.

5. The method of forming an electrical resistor having a high resistance deposited layer which comprises pyrolytically decomposing a gaseous mixture comprising titanium tetrachloride and methane, in which gaseous mixture the ratio of the number of titanium atoms to the number of carbon atoms is about 1/3, at a temperature between 1125° C. and 1200° C., at the surface of a base, heated to said temperature, on which said film is to be deposited.

6. The method of forming an electrical resistor having a high resistance deposited layer which comprises contacting the heated surface of a base on which said layer is to be deposited with a gaseous mixture comprising titanium tetrachloride, a carbonaceous gas, and nitrogen, and in which the said heated surface is at a temperature sufficient to cause decomposition of the said titanium tetrachloride and the said carbonaceous gas.

7. An electrical resistor comprising a non-conducting base having deposited thereon a high resistance deposited layer containing carbon and titanium and of a thickness of from $10^{-4}$ to $10^{-6}$ centimeters, said layer being deposited on said base by pyrolytic decomposition of a gaseous mixture comprising titanium tetrachloride and a carbonaceous gas on a heated surface of said base.

References Cited in the file of this patent

UNITED STATES PATENTS

| | | |
|---|---|---|
| 869,012 | McOuat et al. | Oct. 22, 1907 |
| 2,057,431 | Hobrock | Oct. 13, 1936 |
| 2,405,449 | Robinson et al. | Aug. 6, 1946 |
| 2,551,341 | Scheer et al. | May 1, 1951 |
| 2,556,991 | Teal | June 12, 1951 |
| 2,656,284 | Toulmin | Oct. 20, 1953 |
| 2,671,735 | Grisdale et al. | Mar. 9, 1954 |